(12) United States Patent
Funakoshi et al.

(10) Patent No.: US 6,980,242 B2
(45) Date of Patent: Dec. 27, 2005

(54) SOLID STATE IMAGE SENSING DEVICE

(75) Inventors: Hiromasa Funakoshi, Hirakata (JP); Ryoji Asada, Hirakata (JP); Kazumasa Motoda, Toyonaki (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 948 days.

(21) Appl. No.: 09/731,043

(22) Filed: Dec. 7, 2000

(65) Prior Publication Data

US 2001/0022623 A1 Sep. 20, 2001

(30) Foreign Application Priority Data

Dec. 7, 1999 (JP) ................................. 11-347463

(51) Int. Cl.[7] .............................. H04N 9/64; H04N 3/14
(52) U.S. Cl. ...................................... 348/245; 348/312
(58) Field of Search ............................... 348/241, 243, 348/245, 294, 302–305, 311, 312, 317, 320, 348/322, 323

(56) References Cited

U.S. PATENT DOCUMENTS

| 4,656,503 | A | * | 4/1987 | Hynecek | 348/283 |
| 5,446,493 | A | * | 8/1995 | Endo et al. | 348/320 |
| 5,486,859 | A | * | 1/1996 | Matsuda | 348/311 |
| 5,510,836 | A | * | 4/1996 | Stekelenburg | 348/299 |
| 6,549,647 | B1 | * | 4/2003 | Skunes et al. | 382/150 |
| 6,614,473 | B1 | * | 9/2003 | Kijima | 348/243 |
| 6,654,059 | B1 | * | 11/2003 | Roks et al. | 348/317 |
| 6,686,962 | B1 | * | 2/2004 | Miyahara | 348/311 |
| 2001/0043275 | A1 | * | 11/2001 | Hirota et al. | 348/312 |

OTHER PUBLICATIONS

Itakura et al., "TP 12.3: A Multiple Frame-Interline-Transfer (M-FIT) CCD for Progressive-Scan Camera Systems," ISSCC 93/Session 12/Image Sensors and Displays/Paper TP 12.3, 1993 IEEE International Solid-State Circuits Conference, p190-191.

* cited by examiner

Primary Examiner—Wendy R. Garber
Assistant Examiner—Timothy J. Henn
(74) Attorney, Agent, or Firm—Steptoe & Johnson LLP

(57) ABSTRACT

A solid-state image sensing device comprising a photoelectric converter portion, a solid-state image sensor, and a controlling means. The photoelectric converter portion has a plurality of photoelectric converters arranged in two dimensions on a semiconductor substrate. The solid-state image sensor vertically transfers charges, transferred from the photoelectric converter portion, at separate times of first transfer and second transfer. Further, the photoelectric converter portion has a vertical transfer portion, in which first and fourth gates are provided for odd-numbered photoelectric converters, and second and third gates are provided for even-numbered photoelectric converters, and a horizontal transfer portion for horizontally transferring charges transferred from the vertical transfer portion. The controlling means supplies the vertical transfer portion with vertical transfer pulses and the horizontal transfer portion with horizontal transfer pulses. The controlling means transfers charges from the photoelectric converter portion to the vertical transfer portion such that the charges of odd-numbered pixels and the charges of even-numbered pixels are each transferred in a lump, respectively.

2 Claims, 10 Drawing Sheets

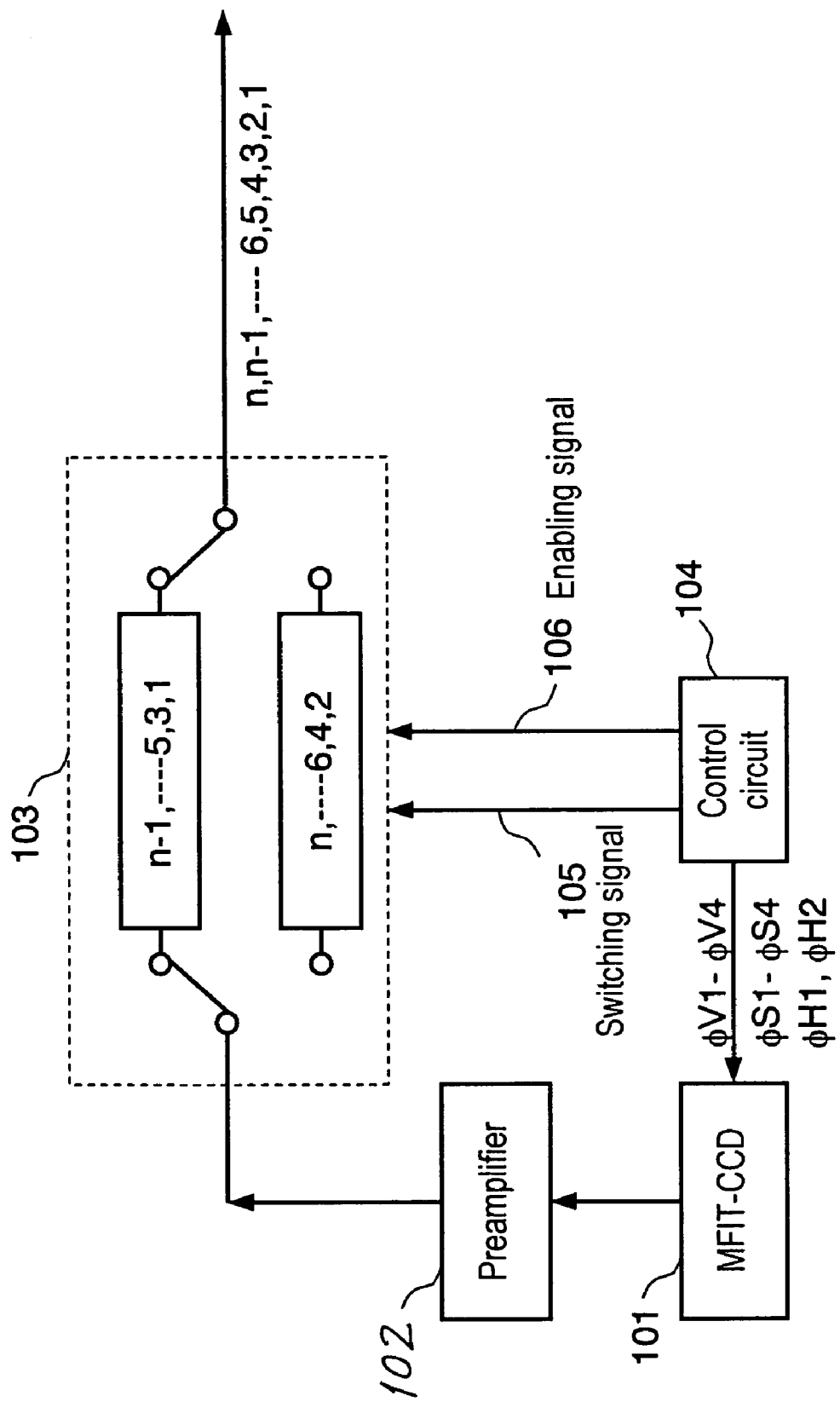

FIG. 2(a) PD group 61
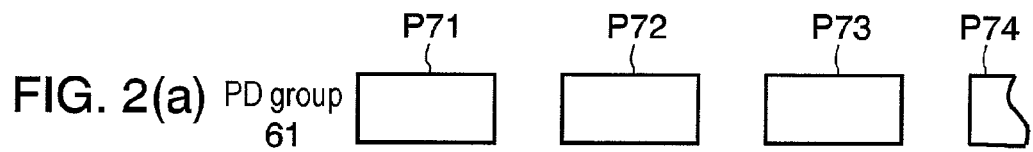
FIG. 2(b) VCCD 62
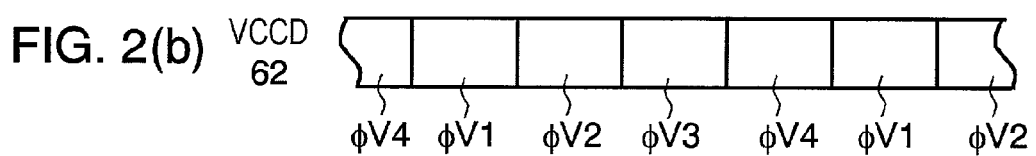
FIG. 2(c) Potential of VCCD 62
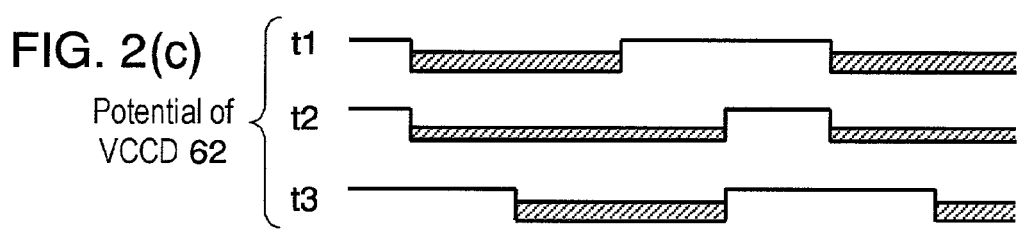
FIG. 3(a) PD group 61
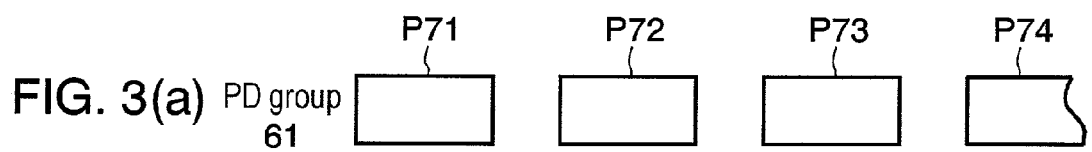
FIG. 3(b) VCCD 62
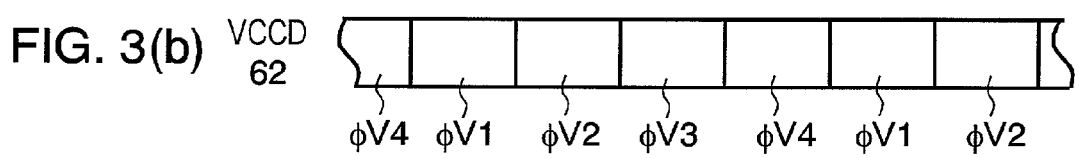
FIG. 3(c) Potential of VCCD 62
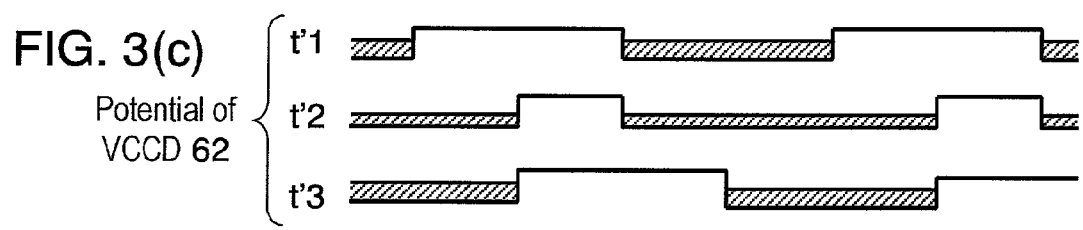

FIG. 12(a) PD group 61
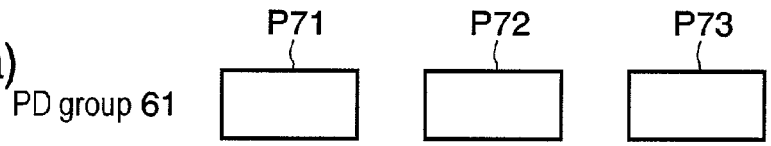
FIG. 12(b) VCCD 62
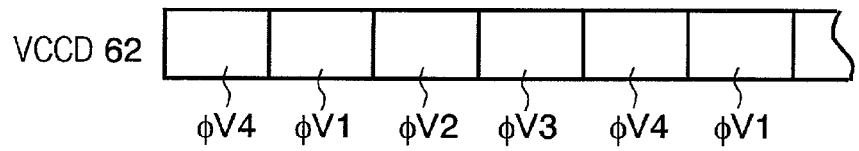
FIG. 12(c) Potential of VCCD 62
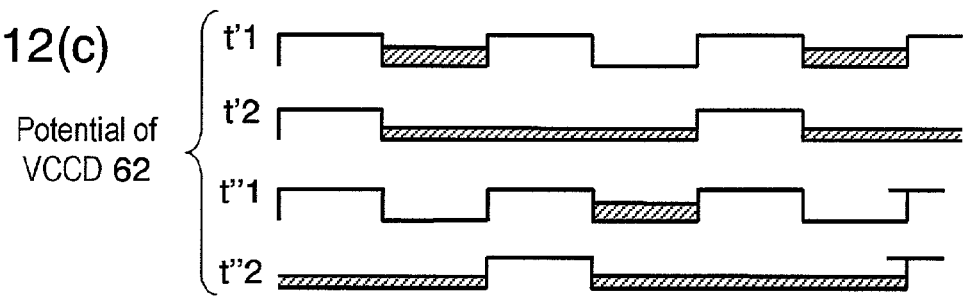
FIG. 13(a) PRIOR ART
Low brightness
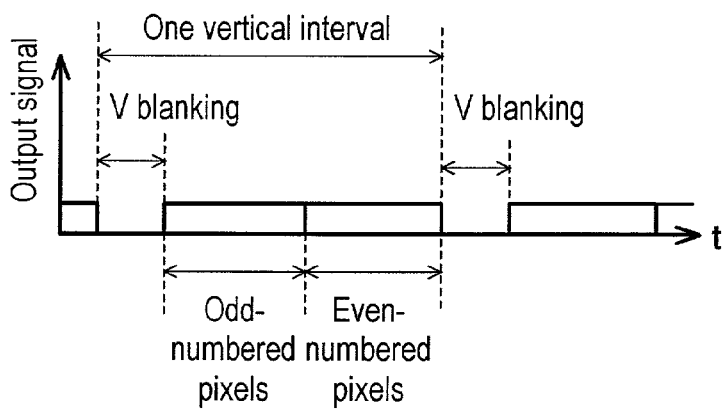
FIG. 13(b) PRIOR ART
High-brightness
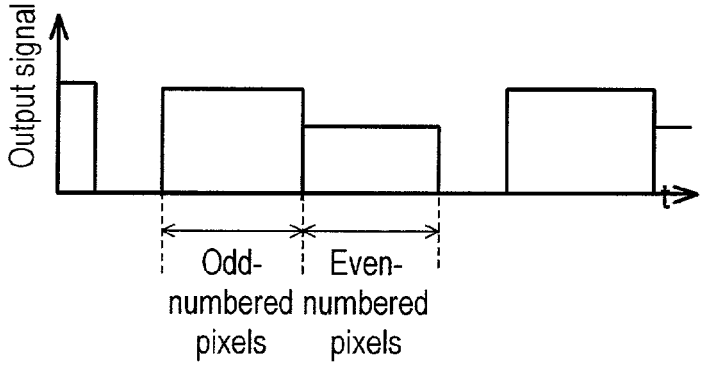

SOLID STATE IMAGE SENSING DEVICE

FIELD OF THE INVENTION

The present invention relates to a solid-state imaging device employing a multiple frame interline transfer type CCD (hereinafter referred to as MFIT-CCD). More particularly, it relates to improvements in picture quality when MFIT-CCD is used for progressive scan.

BACKGROUND OF THE INVENTION

In recent years, a frame interline transfer type charge coupled device (hereinafter referred to as FIT-CCD) has been used in cameras for broadcasting and the like because it introduces small smear. Recently, attention has come to be given to progressive scan as a new picture format, and for implementing it, a solid-state image sensing device of multiple frame interline transfer type CCD (hereinafter referred to as MFIT-CCD) has been developed.

MFIT-CCD is disclosed in ISSCC Digest of Technical Papers, pp. 190–191 (1993).

MFIT-CCD has a characteristic feature that it not only achieves conventional interlace scan but also achieves progressive scan.

When pictures of a bright image objects are taken by a progressive scanning camera which employs such MFIT-CCD, outputs of pixels corresponding to even-numbered scanning lines (hereinafter referred to as even-numbered pixels) are saturated before pixels corresponding to odd-numbered scanning lines (hereinafter referred to as odd-numbered pixels) are saturated. Then, the outputs of the odd-numbered pixels become larger than that of the even-numbered pixels. This phenomenon occurs when scanning is made in the order of odd-numbered pixels first and then even-numbered pixels next. If the order is reversed, the result is inverted. Consequently, the phenomenon results in a difference in output level, namely, a difference in brightness of the picture picked up between odd-numbered pixels and even-numbered pixels, and hence it results in horizontal stripes in a picture, so as to degrade the picture quality.

First, such a phenomenon to degrade the picture quality in the prior art will be described in detail.

FIG. 9 is a block diagram showing an internal structure of MFIT-CCD. MFIT-CCD 60 is an image sensor disposed on a semiconductor substrate and comprises (1) pixel portion 65 formed of a group of photoelectric converters, e.g. photodiodes (hereinafter called PD group) 61, arranged in two dimensions, i.e. horizontal and vertical arrangement and CCD 62 for transferring charges in the vertical direction (hereinafter called VCCD 62), (2) CCD 63 for transferring charges in the horizontal direction (hereinafter called HCCD 63), (3) output amplifier 64, and (4) dummy portion 70. First charge memories 66 and second charge memories 67 do not include PD group and are equivalent to VCCD 62 which is photo-shielded.

In pixel portion 65, vertical transfer pulses φV1 –φV4 read charges obtained by photoelectric conversion in PD group 61, and feed the charges to VCCD 62, and then transfer the charges to charge memories 66 and 67 sequentially. Further, vertical transfer pulses φS1 –φS4 transfer the charges stored in charge memories 66 and 67 to HCCD 63. Horizontal transfer pulses φH1 and φH2 transfer the charges in HCCD 63 to output amplifier 64. Vertical transfer pulses φV1 –φV4 and φS1 –φS4 allow to change potential under the gate electrode (hereinafter called "gate") of VCCD 62, made of poly-silicon or the like, so that charges are transferred vertically. Horizontal transfer pulses φH1 and φH2 allow to change potential under the gate electrode (hereinafter called "gate") of HCCD 63 so that charges are transferred horizontally.

First, in pixel portion 65 of MFIT-CCD, a first transfer signal transfers charges of the odd-numbered pixels of PD group 61 to VCCD 62. Then, vertical transfer pulses φV1 –φV4 vertically transfer the charges of the odd-numbered pixels to charge memories 66. Next, a second transfer signal similarly transfers charges of the even-numbered pixels of PD group 61 to VCCD 62. Thereafter, the transfer signals vertically transfer the charges of odd-numbered pixels stored in charge memories 66 to charge memories 67 and then vertically transfer the charges of even-numbered pixels retained in VCCD 62 to charge memories 66.

Vertical transfer pulses φS1 –φS4 vertically transfer the charges of the odd-numbered pixels stored in charge memories 67 to HCCD 63 and, then, horizontal transfer pulses φH1 and φH2 horizontally transfer those charges to output amplifier 64. Further, vertical transfer pulses φS1 and φS4 vertically transfer the charges of the even-numbered pixels stored in charge memories 66 to charge memories 67 and then vertically transfer those charges to HCCD 63. Horizontal transfer pulses φH1 and φH2 at the next period horizontally transfer the charges of the even-numbered pixels stored in HCCD 63 to output amplifier 64. Thus, the transfer pulses transfer the charges of even-numbered pixels after the charges of odd-numbered pixels have all been transferred to output amplifier 64. Incidentally, similar things occur even if the transfer order of charges is changed in reverse order between odd-numbered pixels and even-numbered pixels.

Output amplifier 64 converts charges into voltage signals and supplies them to preamplifier 68 provided outside MFIT-CCD 60. Preamplifier 68 amplifies these voltage signals, eliminates noises therefrom, and makes analog-to-digital conversion of the signals. The output of preamplifier 68 is transmitted to rearranging circuit 69. Rearranging circuit 69 rearranges charge signals corresponding to odd-numbered pixels (n–1, . . . , 3, 1) and even-numbered pixels (n, . . . , 4, 2) in order of integers (n, n–1, . . . , 4, 3, 2, 1) and supplies these rearranged charge signal to a signal processing circuit in the succeeding stage. The signal processing circuit (not shown) processes the input signals by means of a γ-processing and a knee processing, and then produce voltage signals corresponding to the pixels.

FIG. 10 is a driving timing chart of MFIT-CCD. The first signal in the vertical blanking interval (hereinafter called "VBI") shown in FIG. 10(*a*) sweeps out undesired charges. Thereafter, the transfer pulses at voltage VH shown in FIG. 10(*b*) simultaneously transfer the charges of the odd-numbered pixels and after then that of the even-numbered pixels to VCCD 62, respectively. Vertical transfer pulses at voltage VM (VM<VH) transfer the charges to charge memories 66 and 67 at high speed by means of time compression.

FIG. 11 and FIG. 12 are readout timing charts of MFIT-CCD. FIG. 11 shows timing at interlace scan and FIG. 12 shows timing at progressive scan. To explain the operations in more detail, portions of PD group 61 are illustrated as photodiodes P71, P72, and P73. The gates of VCCD 62 shown in FIG. 11(*b*) and FIG. 12(*b*) are made of poly-silicon as described above. Taking two adjoining photodiodes as one set, vertical transfer pulses φV1 –φV4 are supplied to the gates thereof. FIG. 11(*c*) shows potentials of the respective gates of VCCD 62 at time periods t1 –t4, in which the hatched portions illustrate the charges on pixels. When these charges are to be transferred from photodiodes to VCCD, in general, the pulse at voltage VH as shown in FIG. 10(b) is applied to the gate of φV1. Time period t1 in FIG. 11(c) shows the state of the charges transferred in this way from photodiodes P71 and P73 to the gates of φV1 of VCCD 62. Further, when the pulse at voltage VH is applied to the gate of φV3, the charge signal is transferred from photodiodes P72 and P74 (not shown) to the gates of φV3 of VCCD 62 as shown at time period t2 in FIG. 11 (c).

In the case of interlace scan, the gate of φV2 is turned on as shown at time period t3 in FIG. 11(c), so that the charges of photodiodes P71 and P72 are added together. Likewise, charges of photodiodes P73 and P74 are added together. Then, the added charges are collected under the gate electrodes to which φV2 and φV3 are applied as shown at time period t4 in FIG. 11(c). Thereafter, VCCD 62 alternately cycles the state at time period t3 and the state at time period t4 and, as a consequence, allows the charges to be transferred looking as if a measuring worm advances.

In the case of progressive scan as shown in FIG. 12, operations up to the time period t'1 in FIG. 12(c) are the same as in the case of interlace scan. In the case of progressive scan, however, charges are transferred through the time period t'2 after the charges of odd-numbered pixels have been read out. After the charges of the odd-numbered pixels have all been transferred, charges of even-numbered pixels (for example, those of photodiode P72) are read out, as shown at the time period t"1 in FIG. 12(c), and they are transferred through the state at the time period t"2.

With the conventional progressive scan as described above, there are some problems. FIG. 13 shows output signal levels of MFIT-CCD attained when readout was made as shown in FIG. 12. FIG. 13(a) shows output signal levels obtained from a low brightness image object, and FIG. 13(b) shows output signal levels obtained from a high-brightness object. In the case of a low-brightness image object, there is no level difference in the CCD output signals between odd-numbered pixels and even-numbered pixels. In the case of high-brightness image object, however, the output signal of even-numbered pixels saturate earlier and, hence, the output signal of odd-numbered pixels becomes larger than that of even-numbered pixels. When the readout order of odd-numbered pixels and even-numbered pixels are reversed, inverted phenomena occur.

More particularly, as shown in FIG. 13(b), the saturation voltage of the pixels read out first (odd-numbered pixels, in this case) becomes higher and the saturation voltage of the pixels read out secondly (even-numbered pixels, in this case) becomes lower.

Although this is a matter of presumption, it is supposed that, when first pixels are read out, a portion of signal charges stored in the pixels (photodiodes) to be read out at the next timing flow out into the semiconductor substrate side. Consequently, the saturation voltage of the pixels first read out becomes higher than the saturation voltage of the pixels read out secondly.

The output signals corresponding to odd-numbered pixels and even-numbered pixels are rearranged by rearranging circuit 69 in ascending order of integer as shown in FIG. 9. Consequently, when an image of high-brightness image object was picked up by MFIT-CCD, the above described phenomena cause a difference in reference levels and then in the output signal level between odd-numbered pixels and even-numbered pixels. Thus, a brightness difference is produced in the picture picked up between odd-numbered scanning lines and even-numbered scanning lines and, hence, many horizontal stripes are produced in one frame of picture to degrade the quality of the image. This is the first problem with the conventional art.

A second problem results from the structure of MFIT-CCD and it arises when charges are read out from dummy portion 70 shown in FIG. 9. FIG. 14 is an explanatory drawing of readout timing at boundary portions between constituents of MFIT-CCD. FIG. 14(a) shows the boundary portion between dummy portion 70 and pixel portion 65 and their potentials in relation with potential of VCCD 62. FIG. 14(b) shows the boundary portion between pixel portion 65 and charge memories 66 and their potentials in relation with potential of VCCD 62. Since the state of pixel formation sometimes differs between the edge portion and center portion of pixels 65, then dummy portion 70 is provided to eliminate such difference. Dummy portion 70 generally has an element width of 5 to 10 pixels. For example, dummy portion 70 has dummy photodiodes D1 –D6 as shown in FIG. 14(a). Since no output signals from the dummy portion are needed, it is covered with a photo-shielding member. However, in many cases, photodiodes may not be formed at the edge of dummy portion 70.

A third problem is caused by dark currents. Conventional solid-state imaging devices have been arranged to produce output charges of even-numbered pixels in succession to those of odd-numbered pixels. However, dummy portion 70 produces undesired charges (D1), (D2), and (D3) due to dark currents as shown in FIG. 14(a), though they are small. Hence, when it is attempted to read even-numbered pixels, e.g. charges (P2), (P4), and (P6) of photodiodes P2, P4, and P6, at time period t1 as shown in FIG. 14(b), these desired charges are added up together with undesired charges (D1), (D3), and (D5) of photodiode D1, D3, and D5, so that charges of photodiodes P2, P4, and P6 become (D1+P2), (D3+P4), and (D5+P6) as indicated at time period t2, respectively. Consequently, output signals of photodiodes P2, P4, and P6 become greater by (D1), (D3), and (D5), respectively, than desired values to produce horizontal stripes in the picture when arranged with those of odd-numbered pixels side by side. Further, even in a configuration in which dummy portion 70 includes no photodiodes, undesired charges due to some dark currents are observed, and thus it has been impossible to solve the problem of horizontal stripes appearing in the picture.

FIG. 15 shows changes of dark currents in charge memories 66 and 67 with the laps of time. With use of conventional FIT-CCD included, occurrence of undesired dark currents due to thermal excitation or the like has been unavoidable. Moreover, with the use of MFIT-CCD in progressive scan, appearance of undesired effect of dark currents in the picture becomes more conspicuous. Since the dark current increases with the stored time period of charges, the closer to pixel portion 65 pixels are located, the greater becomes the value of the dark current, and hence the larger undesired charges stored. As understood also from FIG. 15, the value of the dark current is smaller in odd-numbered pixels than that in even-numbered pixels, because the stored time in odd-numbered pixels is shorter than that in even-numbered pixels. Therefore, the problem in this case, like the first and second problems mentioned above, has resulted in occurrence of undesired horizontal stripes in the picture, when outputs in progressive scan are rearranged in integral-numeric order.

SUMMARY OF THE INVENTION

The present invention was made to solve the first, second, and third problems described above with the prior art, and so the object thereof is to provide a solid-state image sensing device producing no horizontal stripes in the picture, i.e., free from picture degradation, even when MFIT-CCD is used for progressive scan therein.

According to the present invention, such advantages can be obtained that a device produces a high quality image, and that the picture is free from occurrence of horizontal stripes, and further that the image sensing device can be used either for interlace scan or progressive scan without any configuration change of MFIT-CCD itself.

According to a first embodiment of the present invention, there is provided a solid-state image sensing device comprising:

a photoelectric converter portion having a plurality of photoelectric converters arranged in two dimensions on a semiconductor substrate;

a solid-state image sensor having a vertical transfer portion for vertically transferring charges, transferred from the photo-electric converter portion, at separate timing of first transfer and second transfer, in which first and fourth gates are provided for odd-numbered photoelectric converters of the photoelectric converter portion and second and third gates are provided for even-numbered photoelectric converters of said photoelectric converter potion, and a horizontal transfer portion for horizontally transferring charges transferred from the vertical transfer portion; and controlling means for supplying the vertical transfer portion with vertical transfer pulses and supplying the horizontal transfer portion with horizontal transfer pulses, wherein said controlling means is characterized by that, in order to transfer charges from the photoelectric converter portion to the vertical transfer portion, first when the first and the fourth gates of the vertical transfer portion, corresponding to photoelectric converters of odd-numbered pixels to be transferred, are turned on to store charges, said controlling means generates vertical transfer pulses for vertically transferring the charges of odd-numbered pixels on the gates in a lump, and next when the second and third gates of the vertical transfer portion, corresponding to photoelectric converters of even-numbered pixels to be transferred, are turned on to store charges, said controlling means generates vertical transfer pulses, for vertically transferring the charges of even-numbered pixels on the gates in a lump.

Here, the controlling means may also be adapted, where first when the second and third gates of the vertical transfer portion, corresponding to photoelectric converters of even-numbered pixels to be transferred first, are turned on to store charges, the controlling means generates vertical transfer pulses for vertically transferring the charges of even-numbered pixels on the gates in a lump, and next when the first and fourth gates of the vertical transfer portion, corresponding to photoelectric converters of odd-numbered pixels to be transferred, are turned on to store charges, the controlling means generate vertical transfer pulses for vertically transferring the charges of odd-numbered pixels on the gates in a lump.

According to a second embodiment of the present invention, there is provided a solid-state image sensing device comprising:

a photoelectric converter portion having a plurality of photoelectric converters arranged in two dimensions on a semiconductor substrate;

a pixel portion having a vertical transfer portion for vertically transferring signal charges of the photoelectric converter portion at separate timing of first transfer and second transfer;

a solid-state image sensor having:
a dummy portion disposed adjacent to the pixel portion in a photo-shielded state and having photoelectric converters which are similar to those in the photoelectric converter portion;

a first charge memory portion for storing charges of odd-numbered pixels vertically transferred from the pixel portion at the time of first transfer; and a second charge memory portion for storing charges of even-numbered pixels vertically transferred from the pixel portion at the time of second transfer; and controlling means for supplying vertical transfer pulses for vertically transferring charges to each of the dummy portion, the pixel portion, the first charge memory portion, and the second charge memory portion of the solid-state image sensing device, wherein the controlling means generates vertical transfer pulses including additional pulses corresponding to the number of pixels of the dummy portion such that undesired charges occurring in the dummy portion are transferred to the first charge memory portion, at the time of first transfer and generates an instructing control signal to allow the undesired charges to be abandoned when the undesired charges are delivered from the solid-state image sensor.

Here, the odd-numbered pixels may be replaced with even-numbered pixels and the even-numbered pixels may be replaced with odd-numbered pixels.

According to a third embodiment of the present invention, there is provided a solid-state image sensing device comprising:

a photoelectric converter portion having a plurality of photoelectric converters arranged in two dimensions on a semiconductor substrate;

a pixel portion having a vertical transfer portion for vertically transferring signal charges of the photoelectric converter portion at separate timing of first transfer and second transfer;

a solid-state image sensor having:
a dummy portion disposed adjacent to the pixel portion in a photo-shielded state and having photoelectric converters which are similar to those in the photoelectric converter portion, a first charge memory portion for storing charges of odd-numbered pixels vertically transferred from the pixel portion at the time of first transfer, and a second charge memory portion for storing charges of even-numbered pixels vertically transferred from the pixel portion at the time of second transfer; and controlling means for supplying vertical transfer pulses for vertically transferring charges to each of the dummy portion, the pixel portion, the first charge memory portion, and the second charge memory portion of the solid-state image sensing device, wherein the controlling means, after charges in the first and second charge memory portions have been transferred, temporarily stops generation of vertical transfer pulses supplied to the first and second charge memory portions, whereupon generates vertical transfer pulses additionally to allow undesired charges corresponding to the pixels of the dummy portion to be time-compressed and transferred at high speed to gates at the starting end of the first charge memory portion and generates an instructing control signal to allow the undesired charges stored in the gates at the starting end to be abandoned when the charges are delivered.

Here, the odd-numbered pixels may also be replaced with even-numbered pixels and the even-numbered pixels may also be replaced with odd-numbered pixels.

According to a fourth embodiment of the present invention, there is provided a solid-state image sensing device comprising:
- a photoelectric converter portion having a plurality of photoelectric converters arranged in two dimensions on a semiconductor substrate;
- a pixel portion having a vertical transfer portion for vertically transferring signal charges of the photoelectric converter portion at separate times of first transfer and second transfer;
- a solid-state image sensor having:
  - a dummy portion disposed adjacent to the pixel portion in a photo-shielded state and provided with photoelectric converters which are similar to those in the photoelectric converter portion,
  - a first charge memory portion for storing signal charges of odd-numbered pixels vertically transferred from the pixel portion at the time of first transfer,
  - a second charge memory portion for storing signal charges of even-numbered pixels vertically transferred from the pixel portion at the time of second transfer, and
  - a horizontal transfer portion for horizontally transferring signal charges vertically transferred from the first charge memory portion and second charge memory portion sequentially; and
- controlling means for supplying vertical transfer pulses for vertically transferring charges to each of the dummy portion, the pixel portion, the first charge memory portion, and the second charge memory portion of the solid-state imaging device and also supplying horizontal transfer pulses for horizontally transferring charges stored in the horizontal transfer portion, wherein
  the controlling means generates vertical transfer pulses including additional pulses corresponding to the number of pixels of the dummy portion such that undesired charges occurring in the dummy portion are transferred to the first charge memory portion at the time of first transfer,
  further generates, vertical transfer pulses for transferring undesired charges stored in the first and second charge memory portions to the horizontal transfer portion during predetermined periods of horizontal scanning interval, for sweeping out undesired charges even at the time other than the time periods of high speed transfer of charges, and then
  generates an instructing control signal to allow the undesired charge signals to be abandoned when the undesired charge signals are delivered from the solid-state image sensor.

Here, the odd-numbered pixels may be replaced with even-numbered pixels and the even-numbered pixels may also be replaced with odd-numbered pixels.

According to a fifth embodiment of the present invention, there is provided a solid-state image sensing device comprising:
- a photoelectric converter portion having a plurality of photoelectric converters arranged in two dimensions on a semiconductor substrate;
- a pixel portion having a vertical transfer portion for vertically transferring charges of the photo-electric converter portion at separate timing of first transfer and second transfer; and
- a solid-state image sensor having:
  - a dummy portion disposed adjacent to the pixel portion in a photo-shielded state and provided with photoelectric converters which are similar to those in the photoelectric converter portion,
  - a first charge memory portion for storing charges of odd-numbered pixels vertically transferred from the pixel portion at the time of first transfer, and
  - a second charge memory portion for storing charges of even-numbered pixels vertically transferred from the pixel portion at the time of second transfer; and
- controlling means for supplying vertical transfer pulses for vertically transferring signal charges to each of the pixel portion, the first charge memory portion, and the second charge memory portion of the solid-state imaging device, wherein
  the first and second charge memory portions are configured such that odd-numbered gates constituting each of the charge memory portions are formed of first poly-silicon gates and
  even-numbered gates constituting each of the charge memory portions are formed of second poly-silicon gates being different in shape from the first poly-silicon gate, and
  the controlling means delivers a control signal such that storage of charges is performed in the poly-silicon gates which produce smaller dark currents.

Here, the odd-numbered pixels may also be replaced with even-numbered pixels and the even-numbered pixels may also be replaced with odd-numbered pixels.

According to a sixth embodiment of the present invention, the controlling means in the solid-state image sensing device of the fifth embodiment is characterized by that
it generates a control signal which controls to select polysilicon gate to be used between the first poly-silicon gates and the second poly-silicon gates by an externally supplied switching signal.

In the present invention described above, first of all, no horizontal stripes are produced in the picture image even if MFIT-CCD is used for progressive scan, that is, a solid-state image sensing device not degrading images can be realized. Second, the structure to add the progressive scanning function can be implemented through an easy method. Third, a solid-state image sensing device can be used for both interlace scan and progressive scan. Further, since things as described above can be realized without any change in the semiconductor production process for MFIT-CCD nor any change in structures of the photoelectric converting potion, each of the transferring portions, and the charge memory portions of CCD, so the invention is very effective in practical use.

BRIEF DESCRIPTION OF THE DRAWINGS

FIG. 1 is a block diagram showing a structure of a solid-state image sensing device according to first to fourth embodiments of the invention.

FIG. 2 is an explanatory drawing of readout timing of odd-numbered pixels in a solid-state image sensing device according to the first embodiment of the invention.

FIG. 3 is an explanatory drawing of readout timing of even numbered pixels in the solid-state image sensing device according to the first embodiment of the invention.

FIG. 12 is a readout timing chart in the case where MFIT-CCD is driven to make progressive scan.

FIG. 13 is an explanatory drawing showing output levels of odd-numbered pixels and even-numbered pixels at the time of low brightness and high brightness in a conventional CCD driving method.

DESCRIPTIONS OF THE PREFERRED EMBODIMENTS

Figure 9:
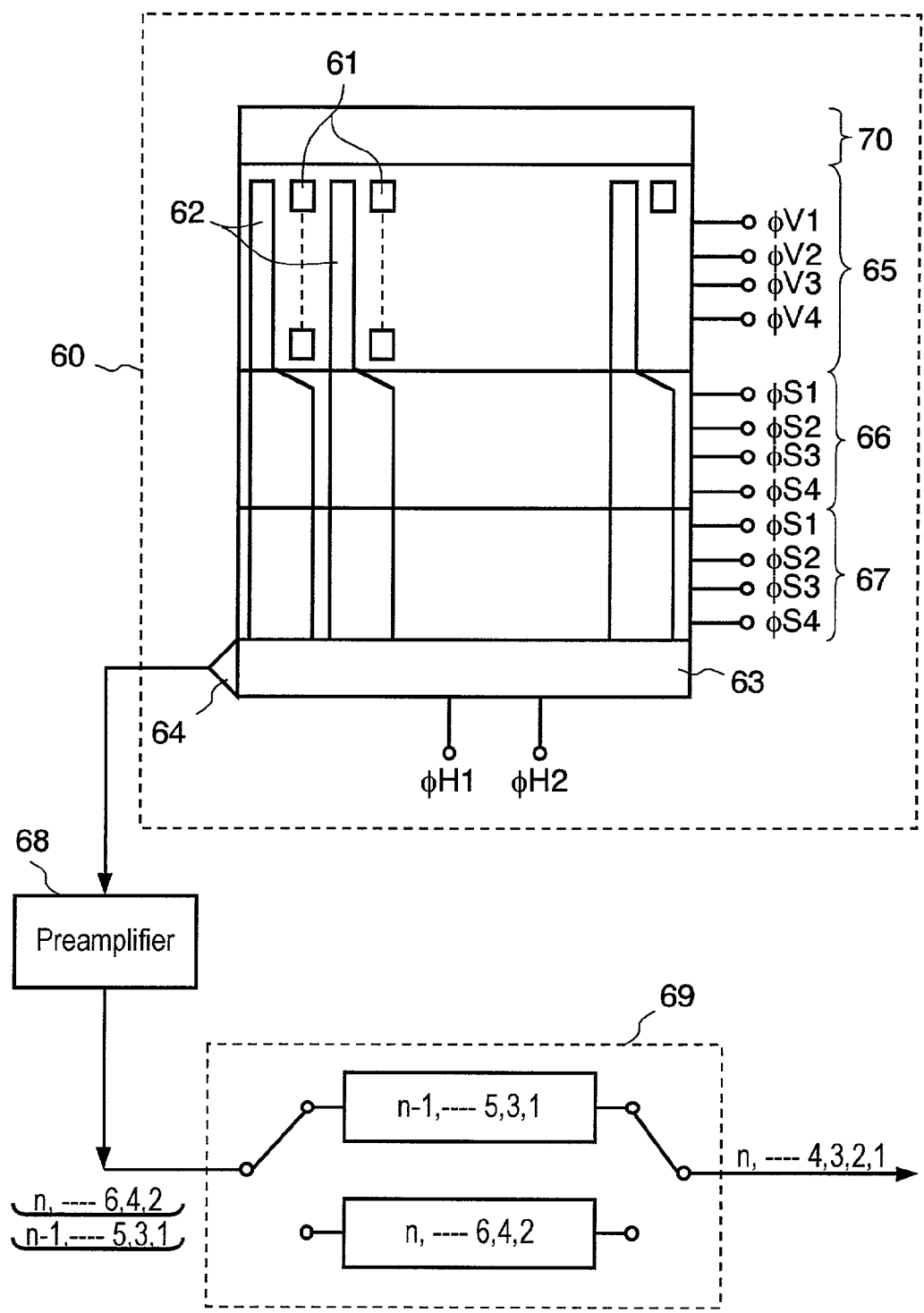
FIG. 9 is a block diagram showing an internal structure of MFIT-CCD and a structure in outline of a rearranging circuit.

A solid-state image sensing device according to a first embodiment of the invention and a driving method thereof will be described with reference to accompanying drawings. FIG. 1 is a block diagram showing a structure of a solid-state image sensing device according to first to fourth embodiments. The solid-state image sensing device comprises a solid-state image sensor formed of MFIT-CCD 101, preamplifier 102, rearranging circuit 103, and controlling means, i.e., control circuit 104. The structure of MFIT-CCD 101 is the same as that of MFIT-CCD 60 shown in FIG. 9. Control circuit 104 supplies vertical transfer pulses $\phi$V1 –$\phi$V4, vertical transfer pulses $\phi$S1 –$\phi$S4, and horizontal transfer pulses $\phi$H1 and $\phi$H2 to MFIT-CCD 101 and supplies switching signal 105 and enabling signal 106 to rearranging circuit 103.

MFIT-CCD 101 puts pick-up charges generated therein out to preamplifier 102 as image signals in order of odd-numbered pixels, first, and then even-numbered pixels, next. Preamplifier 102 not only amplifies image signals but also performs as noise eliminator as well as analog-to-digital converter. Rearranging circuit 103 receives digitized image signals from preamplifier 102, and then switches alternatively the image signals in order of odd-numbered pixels (n−1, n−3, . . . , 5, 3, 1) and even-numbered pixels (n, n−2, . . . , 6, 4, 2), so as to rearrange them in integral order (n, n−1, n−2, . . . , 6, 5, 4, 3, 2, 1) in turn, and delivers the pixel signals. In the first embodiment of the invention, control circuit 104 supplies vertical transfer pulses $\phi$V1 –$\phi$V4 not in the conventional manner but in the manner to be described later. Further, in the second embodiment and third embodiment of the invention to be described later, the timing between vertical transfer pulses $\phi$V1 –$\phi$V4 and vertical transfer pulses $\phi$S1 –$\phi$S4 is shifted so as to realize desired functions.

FIG. 2 and FIG. 3 are timing charts showing the ways in which the control circuit reads out picture signals of the solid-state image sensing device in the first embodiment of the invention. FIG. 2 shows the timing at which charges of odd-numbered pixels are read out at the time of first transfer and FIG. 3 shows the timing at which charges of even-numbered pixels are read out at the time of second transfer. The driving method in the present embodiment is characterized by that potential changes of the gates at the time of readout, namely, at the timing when charges are transferred from PD group 61 to VCCD 62 are optimized on the basis of results of various experiments so as to remove drawbacks in the prior art.

In FIG. 2(a) and FIG. 3(a), portions of PD group 61 are indicated by P71, P72, P73 and P74 for ease of explanation. When control circuit 104 reads out picture-signal charges of photodiodes P71 and P73 as odd-numbered pixels, as indicated at time period t1 in FIG. 2(c), it applies a voltage VM to the gate of $\phi$V2 and the gate of $\phi$V1 during vertical blanking interval (hereinafter called VBI) shown in FIG. 10, so as to bring them into ON (readout) state. Successively, the picture-signal charges are transferred from PD group 61 to VCCD 62 by means of the pulse at voltage VH (see FIG. 10b) applied to the gate of $\phi$V1. By repetition of the state at the time period t2 and the time period t3 of FIG. 2(c), the picture-signal charges are vertically transferred within VCCD 62.

Figure 10A:
FIG. 10 is an explanatory drawing showing driving timing of MFIT-CCD.
Figure 10B:
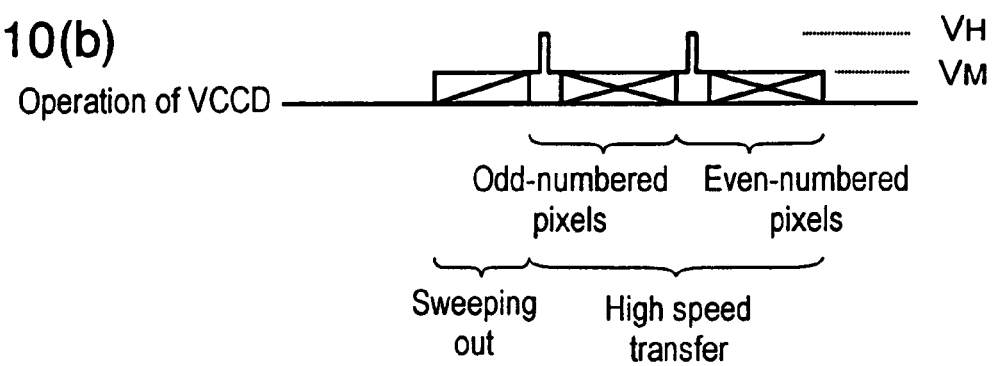
Figure 11A:
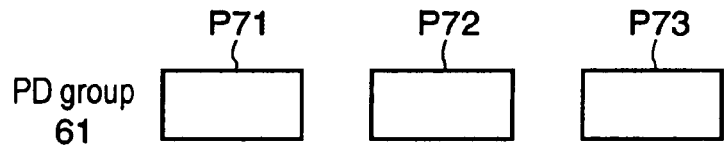
FIG. 11 is a readout timing chart in the case where MFIT-CCD is driven to make interlace scanning.
Figure 11B:
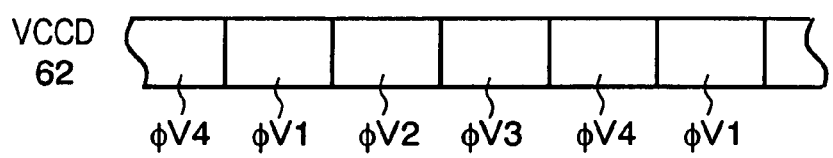
Figure 11C:
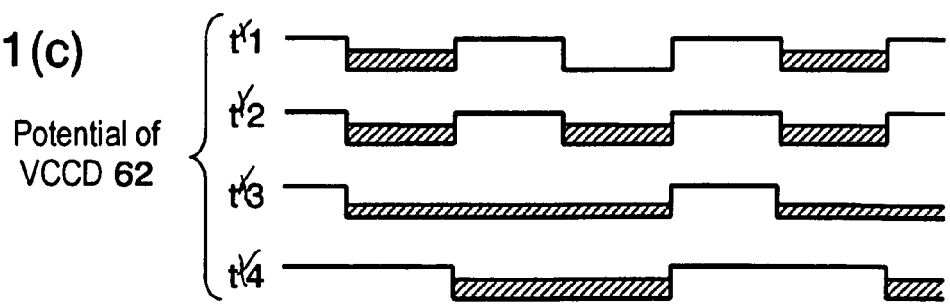

When picture-signal charges of photodiodes P72 and P74 as even-numbered pixels are to be read out, similarly to the case with odd-numbered pixels, control circuit 104, applies voltage VM to the gate of $\phi$V4 and the gate of $\phi$V3 during VBI of FIG. 10a as indicated at time period t'1 in FIG. 3(c). In succession thereto, the pulse at voltage VH applied to the gate of $\phi$V3 transfers the picture signal charges of photodiodes P72 and P74 to VCCD 62. Thereafter, repetition of the state at time period t'2 and time period t'3 in FIG. 3(c) vertically transfers the picture-signal charges toward charge memories 66 and 67 within VCCD 62.

Although the driving method in the present embodiment has been accomplished by many trials and errors through numbers of experiments, it is one of the best countermeasure taken to equalize saturation voltages of odd-numbered pixels and even-numbered pixels. It is presumed that the result described above has been brought about by forming standby state of the poly-silicon gates prior to the readout of photodiodes by applying the signal of voltage VM, and then thereby changing the flow of leakage of signal charges. In short, the application of voltage VM to the gates of $\phi$V1 and $\phi$V2 for odd-numbered pixels and the application of voltage VM to the gates of $\phi$V4 and $\phi$V3 for even-numbered pixels bring about the standby states of the respective pixels. Thereafter, the pulse at voltage VH is applied to the gates of $\phi$V1 and $\phi$V3.

Through the operations described above, this embodiment of the invention has prevented the phenomenon of only even-numbered pixels (group of pixels to be read in the second place) becoming saturated earlier in the high brightness image object from occurring.

Figure 4:
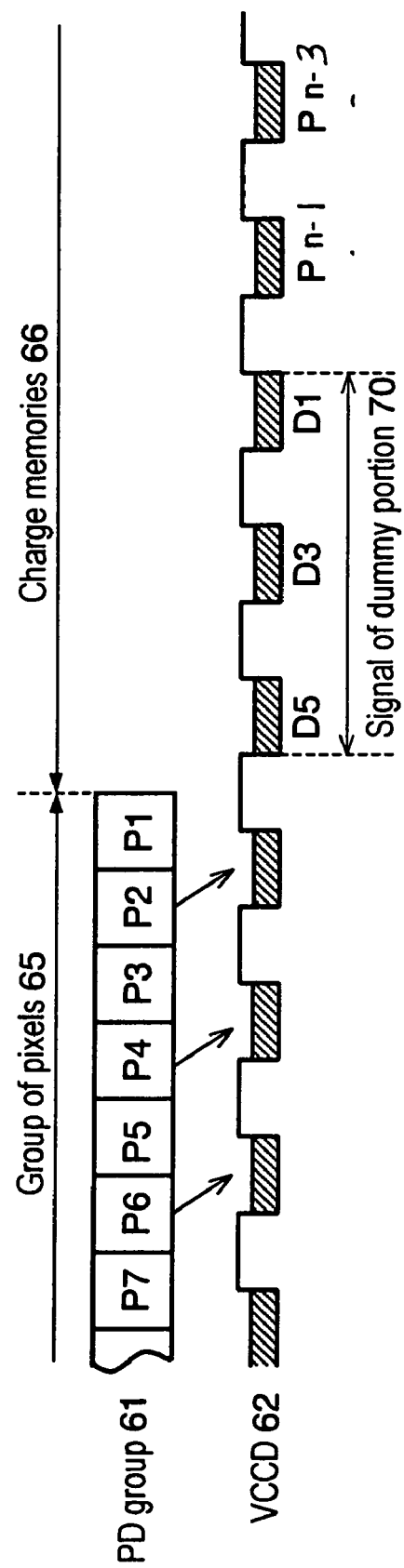
FIG. 4 is an explanatory drawing of a case where charges on the boundary between the portion of pixels and the portion of charge memories are read out in a solid-state image sensing device according to the second embodiment of the invention.
Figure 14A:
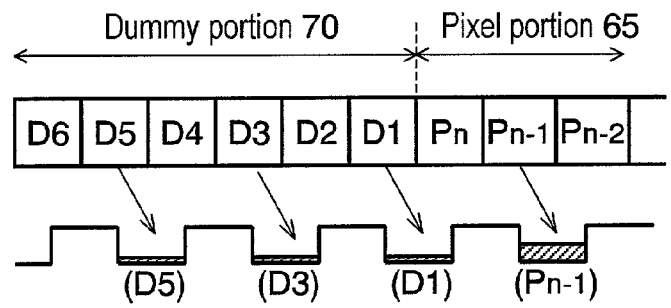
FIG. 14 is an explanatory drawing showing charge distribution on the boundary between the portion of pixels and other regions.
Figure 14B:
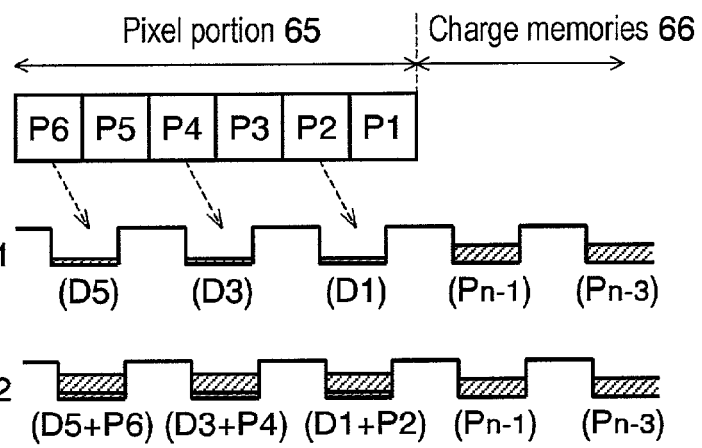
Figure 15:
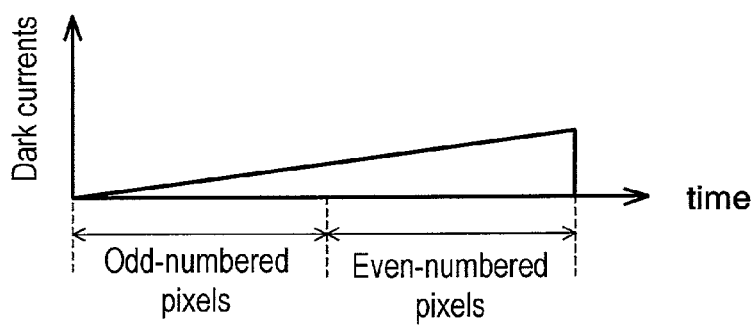
FIG. 15 is an explanatory drawing showing changes of dark current in charge memories with the laps of time.

Next, the driving method of the solid-state image sensing device of the second embodiment of the invention will be described. FIG. 4 is a readout timing chart of CCD in the second embodiment and it particularly shows the state at the boundary portion between group of pixels 65 and charge memories 66. This embodiment is characterized by that, when the charges of odd-numbered pixels are transferred, undesired charges corresponding to the pixels of dummy portion 70 are excessively transferred vertically. In order that charges (P2), (P4), and (P6) of even-numbered photodiodes P2, P4, and P6 to be read out may not overlap with undesired charges (D1), (D3), and (D5) of photodiodes D1, D3, and D5 of the dummy portion 70 on the gates at the starting end of the charge memories 66, control circuit 104 generates such three additional vertical transfer pulses as shown in FIG. 4, and then it supplies them to VCCD 62. Consequently, undesired charges (signals of dummy portion 70) are vertically transferred just after transfer of the signal charges of odd-numbered pixels. This arrangement prevents from occurrence of the state indicated at time period t2 in FIG. 14 and prevents undesired charges from being mixed with desired charges, and then can avoid the undesired.

Thereafter, when the pick-up picture signal is read out through preamplifier 102, undesired charges (D1), (D2), and (D3) produced in dummy portion 70 are eliminated during the operation of rearranging circuit 103, so that desired signal charges of even-numbered pixels (P6), (P4), and (P2) are obtained. The method described above can solve the problem of horizontal stripes due to the undesired charges of even-numbered pixels. Since some extra gates are normally provided as a margin in the charge memories, the transfer method of the present embodiment can be implemented within the range of the design margin.

Figure 5A:
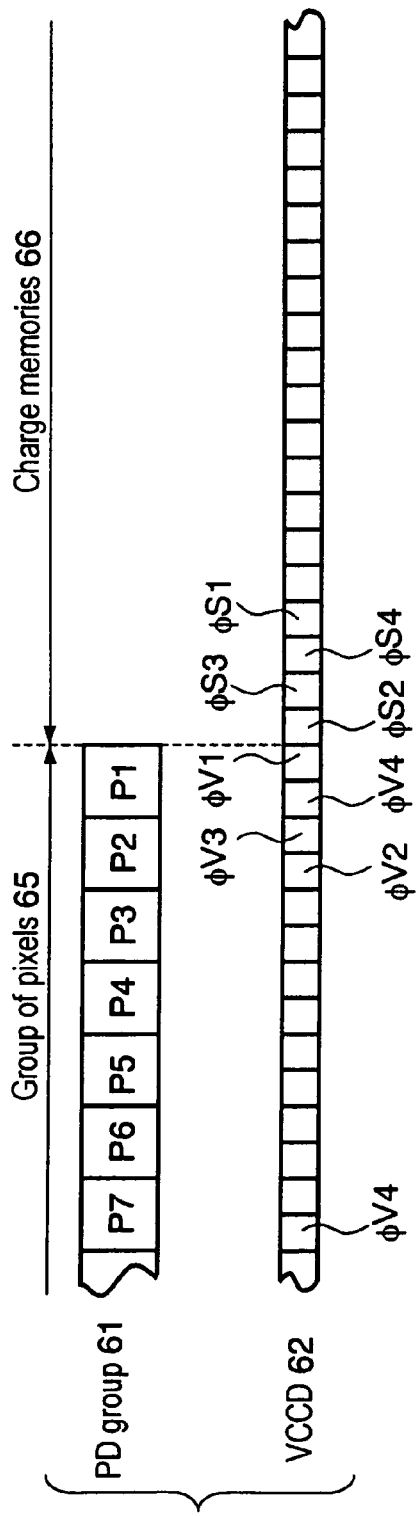
FIG. 5 is a drawing explanatory of timing in readout of charges on the boundary between the portion of pixels and the portion of charge memories in a solid-state image sensing device according to the third embodiment of the invention.
Figure 5B:
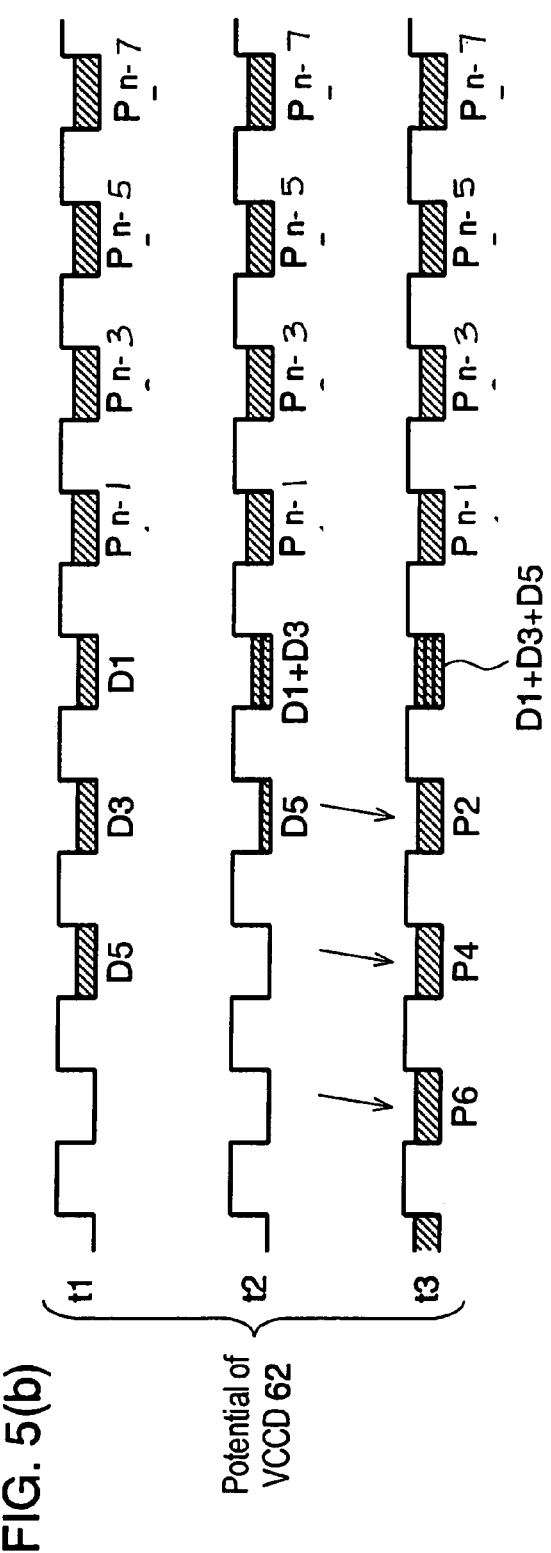

The driving method of the solid-state image sensing device of the third embodiment of the invention will be described with reference to FIG. 5. FIG. 5 is a readout timing chart for VCCD 62 of the third embodiment. The present embodiment is characterized by that a plurality of undesired charges in dummy portion 70 described in the second embodiment are arranged to be stored on just one gate. FIG. 5(a) shows a state at the boundary portion between group of pixels 65 and charge memories 66, and particularly shows positional relationship between PD group 61 and VCCD 62. FIG. 5(b) shows a state of charges, i.e. potentials on gates of VCCD 62 in relation to time.

After charges of odd-numbered pixels are read out, these charges are transferred within VCCD 62. When the first charges (D1) of dummy portion 70 has entered charge memories 66 as A indicated at time period t1 in FIG. 5(b), charge transfer within charge memories 66 and 67 are stopped. In the meantime, however, since charge transfer in pixels 65 are continued, charges (D3) and charges (D5) are successively added to charges (D1), so as to result in the states as indicated at time period t2 and time period t3. Hence, charges (D1), (D3), and (D5) are added together in just one gate to produce one set of charge (D1+D3+D5) as indicated at time period t3. This charge (D1+D3+D5) may then be abandoned. Meanwhile, charges of odd-numbered pixels, i.e. photodiodes (P1, P3, ..., and Pn−1), and charges of even-numbered pixels, i.e., photodiodes (P2, P4, ..., and Pn), are not added to each other. Control circuit 104 can realize the series of operations described above by controlling, respectively, either supply or not supply each of vertical transfer pulses $\phi V1 - \phi V4$ and $\phi S1 - \phi S4$ with each of pixels 65 as well as with each of charge memories 66 and 67, independently.

Figure 6A:
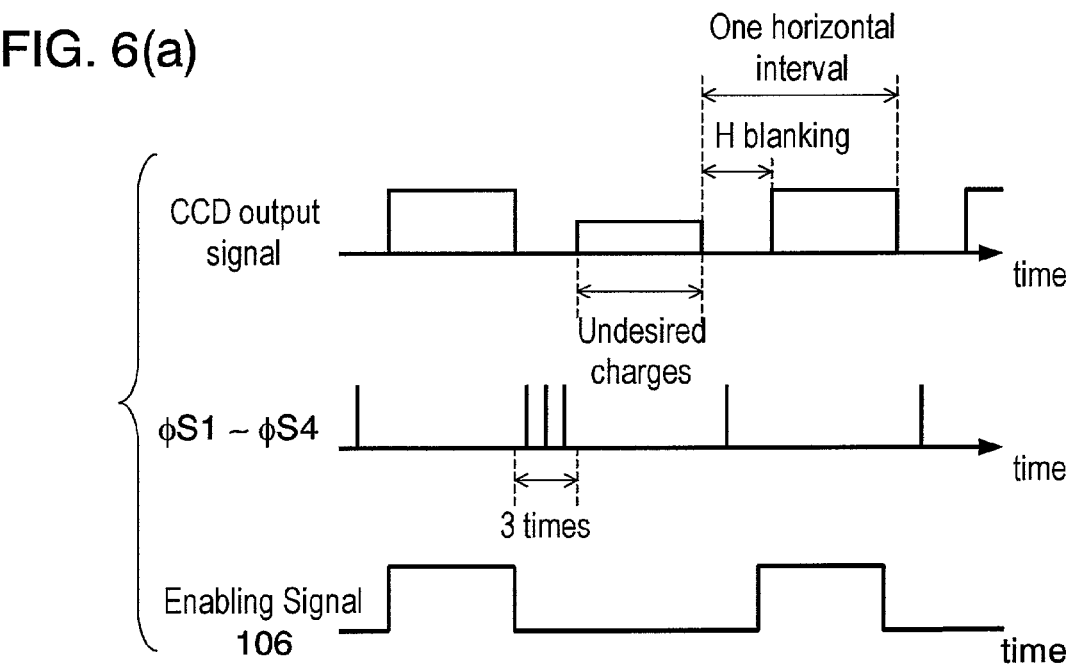
FIG. 6 is an explanatory drawing showing readout timing of undesired charges in a solid-state image sensing device according to the fourth embodiment of the invention.

The method of driving the solid-state image sensing device according to the fourth embodiment will be described with reference to FIG. 6. FIG. 6 is a timing chart showing the driving method of CCD in the present embodiment. The embodiment is characterized by that control circuit 104 controls HCCD 63 shown in FIG. 9, so that it compress in time and adds up the undesired charges of dummy portion 70 of VCCD 62. FIG. 6(a) is a drawing explanatory of an application of the present driving method to the solid-state image sensing device of the second embodiment. Since HCCD 63 is kept in its stopped state during the horizontal blanking interval (hereinafter called HBI), three times of operations of vertical transfer pulses $\phi S1 - \phi S4$ during this interval allow adding up charges of three pixels together within HCCD 63. Thus, charges of three pixels are put together as if charge of just one pixel slot.

However, as the added-up charges into the one pixel slot are of undesired signals, so if operations are made in conventional way heretofore, the undesired-pixel signals would be delivered to the next stage. To avoid this, control circuit 104 in FIG. 1 supplies enabling signal 106 to rearranging circuit 103 at the time of delivery of pick-up signals, as shown in FIG. 6(a), so that the storing operations of undesired pixel signals are stopped. More particularly, enabling signal 106 acts so that the storing operations are stopped during the HBI in normal conditions but it further acts so that the storing operation are stopped during the period of time when signals of dummy portion 70 are delivered. Although switching signal 105 allows pixel signals to be delivered from rearranging circuit 103, switching signal 105 can be generated as usual because there are no undesired signals stored therein.

Figure 6B:
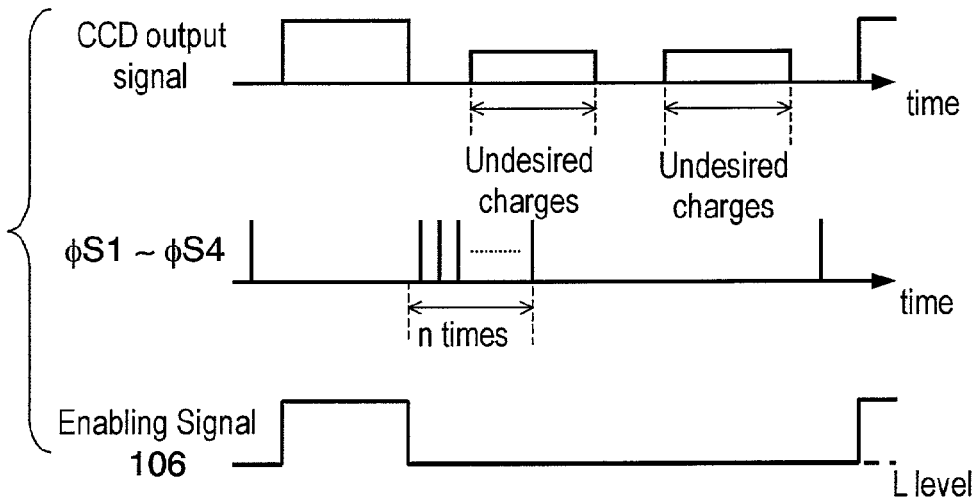

FIG. 6(b) is a timing chart showing another driving method in the case where the dummy portion 70 has a large number of dummy pixels. When the number of dummy pixels in the dummy portion 70 is large, it becomes impossible to finish the adding process within the HBI even if undesired charges are time-compressed. Therefore, control circuit 104 generates n times of vertical transfer pulses $\phi S1 - \phi S4$, taking a time period exceeding the HBI period, to add up charges corresponding to n pixels within HCCD 63. At this time, a plurality of horizontal scanning periods are required for disposing of the undesired charges. Rearranging circuit 103 stops storage of pixel signals while enable signal 106 is at its low level. Further, when photodiodes are provided as dummy pixels in dummy portion 70, charges similar to those from pixel portion 65 sometimes emerge on account of abnormal reflection of light within an image sensing device. Then, if the configuration of the third embodiment is used, undesired charges may overflow at specific gates within VCCD 62 to produce bad effects even on the adjoining pixels. The third embodiment may preferably be used when dummy portion 70 has no photodiodes or has photodiodes completely photo-shielded, so that the addition of undesired charges within VCCD 62 can be minimized.

Figure 7:
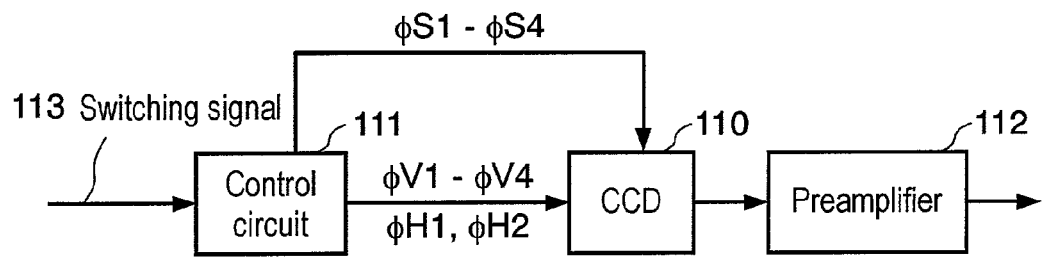
FIG. 7 is a block diagram showing a structure of a solid-state image sensing device according to the fifth embodiment of the invention.

A driving method of the solid-state image sensing device according to the fifth embodiment of the invention will be decried with reference to FIG. 7 and FIG. 8. FIG. 7 is a block diagram showing a structure of the solid-state image sensing device according to the fifth embodiment of the invention. The solid-state image sensing device comprises CCD 110, preamplifier 112, and control circuit 111. CCD 110 here may be any image sensor of MFIT-CCD 101, of MFIT-CCD 60 shown in FIG. 9, or of FIT-CCD. Interrelationships among control circuit 111, CCD 110, and preamplifier 112 are the same as in FIG. 1. However, switching signal 113 is fed into control circuit 111 so that driving conditions of vertical transfer pulses $\phi S1 - \phi S4$ are changed according to the need.

Figure 8A:
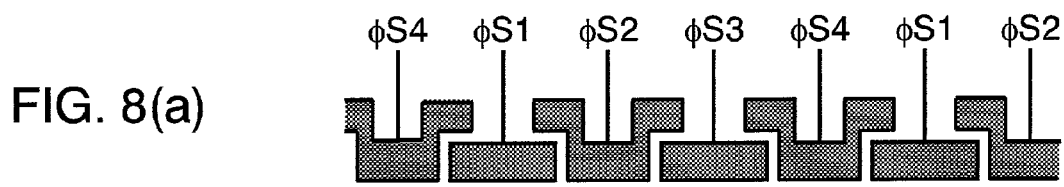
FIG. 8 is an explanatory drawing showing driving timing of charge memories in the fifth embodiment of the invention.
Figure 8B:
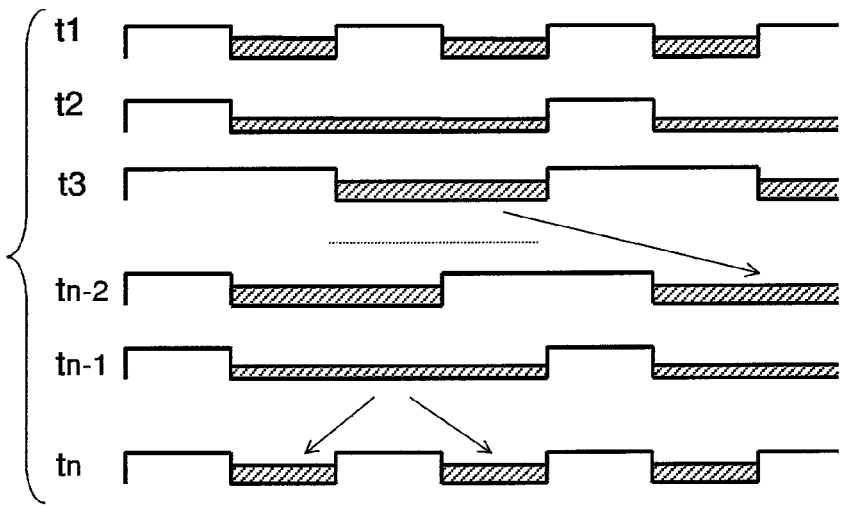
Figure 8C:

FIG. 8 is a timing chart showing a driving method of charge memories in the present embodiment. FIG. 8(a) is a vertical sectional view of a semiconductor substrate particularly showing the structure of poly-silicon gates. FIGS. 8(b) and 8(c) are explanatory drawings showing status conditions of potentials of the gates corresponding to each of time periods t1, t2, t3, ..., tn−2, tn−11, tn and t′1. In the charge memories used heretofore, charges have been stored on two continuous poly-silicon gates different in laminar structure. In contrast, the charge memories of the present embodiment are characterized by having charges stored under poly-silicon gates on the same layer. More particularly, charges are stored under the poly-silicon gate on the first layer to which vertical transfer pulses φS1 and φS3 are applied, as indicated at time period t1 in FIG. 8(b). When charges are transferred, after turning on vertical transfer pulse φS2 as indicated at time period t2, control circuit 111 repeats transferring drive as indicated at time periods t3, . . . , tn−2, tn−1, so that charges are transferred looking as if a measuring worm advances. Finally, vertical transfer pulse φS2 is turned off, so that the state at time period tn is reached and, thus, the same state as that at time period t1 is restored.

Time period t'1 in FIG. 8(c) indicates the case where charges are stored under poly-silicon gates on the second layer to which vertical transfer pulses φS2 and φS4 are applied, where the same operations as described above are performed concerning charge transfer. The same storing operations of FIT-CCD are performed, of course, as that of MFIT-CCD.

Through a number of experiments, it has been known that the generation of dark currents in the charge memories depends on the gate structure of the charge memories, and that, in particular, the generation of dark currents tends to greatly differ between poly-silicon on the first layer and poly-silicon on the second layer. However, it depends on the way of semiconductor production process whether it is the first layer of the poly-silicon layer or the second layer thereof that generates a larger quantity of dark currents. Accordingly, in the present embodiment, it is designed such that the poly-silicon layer to store charges thereon is changeable by means of switching signal 113. Therefore, it is possible to greatly reduce the effect of the dark currents generated in the charge memories by selecting either the first layer or the second layer, whichever will generate a smaller dark currents, for storing charges thereon.

In the embodiments described above, charges of odd-numbered pixels (odd-numbered pixels corresponding to odd-numbered scanning lines) have been vertically transferred at the first transfer, and following then charges of even-numbered pixels (even-numbered pixels corresponding to even-numbered scanning lines) have been vertically transferred at the second transfer. However, the present invention is equally applicable even if charges of even-numbered pixels are vertically transferred at the first transfer and following then charges of odd-numbered pixels are vertically transferred at the second transfer.

What is claimed is:

1. A solid-state image sensing device comprising:
   a) a photoelectric converter portion having a plurality of photoelectric converters arranged in two dimensions on a semiconductor substrate;
   b) a pixel portion comprising a vertical transfer portion for vertically transferring signal charges of said photoelectric converter portion at separate timing of first transfer and second transfer; and
   a solid-state image sensor provided by one of
   c) a solid-state image sensor comprising:
      c1) a dummy portion located adjacent to said pixel portion in a photo-shielded state and having photoelectric converters that are similar to those in said photoelectric converter portion;
      c2) a first charge memory portion for storing charges of odd-numbered pixels vertically transferred from said pixel portion at the time of first transfer; and
      c3) a second charge memory portion for storing charges of even-numbered pixels vertically transferred from said pixel portion at the time of second transfer, and
   c') another solid-state image sensor comprising:
      c'1) a dummy portion located adjacent to said pixel portion in a photo-shielded state and having photoelectric converters that are similar to those in said photoelectric converter portion;
      c'2) a first charge memory portion for storing charges of even-numbered pixels vertically transferred from said pixel portion at the time of first transfer; and
      c'3) a second charge memory portion for storing charges of odd-numbered pixels vertically transferred from said pixel portion at the time of second transfer; and
   d) controlling means for supplying vertical transfer pulses for vertically transferring charges to each of said dummy portion, said pixel portion, said first charge memory portion, and said second charge memory portion of said solid-state image sensing device, wherein
said controlling means, after charges in said first charge memory portion and second charge memory portion have been transferred, temporarily stops generation of vertical transfer pulses supplied to said first and second charge memory portions, whereupon said controlling means generates vertical transfer pulses additionally to allow undesired charges corresponding to the pixels of said dummy portion to be time-compressed and transferred at high speed to gates at the starting end of said first charge memory portion generates an instructing control signal to allow the undesired charges stored in the gates at the starting end to be abandoned when the charges are delivered.

2. A solid-state image sensing device comprising:
   a) a photoelectric converter portion having a plurality of photoelectric converters arranged in two dimensions on a semiconductor substrate;
   b) a pixel portion having a vertical transfer portion for vertically transferring charges of said photoelectric converter portion at separate times of first transfer and second transfer;
   c) a dummy portion located adjacent to said pixel portion in a photo-shielded state and having photoelectric converters that are similar to those in said photoelectric converter portion;
   a solid-state image sensor provided by one of
   d) a solid-state image sensor comprising:
      d1) a first charge memory portion for storing charges of odd-numbered pixels vertically transferred from said pixel portion at the time of first transfer;
      d2) a second charge memory portion for storing charges of even-numbered pixels vertically transferred from said pixel portion at the time of second transfer; and
      d3) a horizontal transfer portion for horizontally transferring charges vertically transferred from said first charge memory portion and second charge memory portion sequentially, and
   d') another solid-state image sensor comprising:
      d'1) a first charge memory portion for storing charges of even-numbered pixels vertically transferred from said pixel portion at the time of first transfer;
      d'2) a second charge memory portion for storing charges of odd-numbered pixels vertically transferred from said pixel portion at the time of second transfer; and d'3) a horizontal transfer portion for horizontally transferring charges vertically transferred from said first charge memory portion and second charge memory portion sequentially; and e) controlling means for supplying vertical transfer pulses for vertically transferring charges to each of said dummy portion, said pixel portion, said first charge memory portion, and said second charge memory portion of said solid-state imaging device and also supplying horizontal transfer pulses for horizontally transferring signal charges stored in said horizontal transfer portion, wherein said controlling means, at the time of first transfer, generates vertical transfer pulses including additional pulses corresponding to the number of pixels of said dummy portion such that undesired charges occurring in said dummy portion are transferred to said first charge memory portion, further generates vertical transfer pulses for transferring undesired charges stored in said first and second charge memory portions to said horizontal transfer portion during predetermined periods of horizontal scanning interval, even at the time other than the time periods of high speed transfer of charges for sweeping out undesired charges, and then generates an instructing control signal to allow the undesired charge signals to be abandoned when the undesired charge signals are delivered from said solid-state image sensor.

* * * * *